United States Patent [19]

Adams

[11] Patent Number: 4,509,603
[45] Date of Patent: Apr. 9, 1985

[54] ADJUSTABLE CULTIVATOR TOOL HOLDER

[76] Inventor: Louis E. Adams, U.S. Rte. 1, Box 59E, Leary, Ga. 31762

[21] Appl. No.: 521,776

[22] Filed: Aug. 9, 1983

[51] Int. Cl.³ .............................................. A01B 65/02
[52] U.S. Cl. .................................. 172/427; 172/624.5; 172/656
[58] Field of Search ...................... 172/476, 624, 624.5, 172/741, 744, 654, 656, 427, 738

[56] References Cited

U.S. PATENT DOCUMENTS

| | | | |
|---|---|---|---|
| 764,062 | 7/1904 | Long | 172/654 |
| 2,070,155 | 2/1937 | Day, Jr. | 172/741 X |
| 2,899,776 | 8/1959 | Arnold | 172/624.5 X |
| 3,554,297 | 1/1971 | Lehman | 172/624.5 X |
| 3,848,679 | 11/1974 | Tonsfeldt | 172/762 |
| 3,921,726 | 11/1975 | Connor et al. | 172/624.5 X |
| 4,033,417 | 7/1977 | Rau et al. | 172/624.5 X |
| 4,282,936 | 8/1981 | Zuhone et al. | 172/624.5 X |

FOREIGN PATENT DOCUMENTS

| | | | |
|---|---|---|---|
| 203557 | 9/1923 | United Kingdom | 172/656 |
| 651644 | 4/1951 | United Kingdom | 172/656 |

*Primary Examiner*—Richard T. Stouffer
*Attorney, Agent, or Firm*—Jones, Tullar & Cooper

[57] ABSTRACT

An adjustable cultivator tool holder for attachment to, and use with a multi-row cultivator system, is disclosed. An elongated tool bar is attached to a tractor and carries a plurality of adjustable cultivator tool holders. Each such tool holder, in turn, supports cultivating tools such as plows. The spacing of the plows, with respect to each other, in response to crop row spacing, is accomplished by sliding tool carrying collars or sleeves along frame arms which carry the sleeves. These sleeves can be secured in a desired position by the use of quick change pins or the like. Each tool carrying sleeve and its tool can be completely removed from the tool holder and moved to another frame arm, if desired, to maximize tool wear. A number of different cultivator tools can be secured to the adjustable cultivator tool holder in accordance with the disclosed invention.

3 Claims, 5 Drawing Figures

ADJUSTABLE CULTIVATOR TOOL HOLDER

FIELD OF THE INVENTION

The present invention is directed generally to a cultivator tool holder. More particularly, the present invention is directed to an adjustable holder assembly for cultivator tools such as plow blades. Most specifically, the present invention is directed to an adjustable cultivator tool holder for use with a tool bar of a multi-row cultivator assembly. The tool bar is adapted to be attached to a vehicle such as a tractor for movement along rows of crops requiring cultivation. Cultivating tools are adjustably positioned on the tool bar by use of the tool holder in accordance with the present invention. This tool holder facilitates the transverse and longitadinal spacing of the various individual tools so that the tools can be properly spaced in accordance with the widths of the rows of crops under cultivation. The adjustable cultivator tool holder also enhances smoothness of operation of the cultivator and prolongs tool life by equalizing tool wear.

DESCRIPTION OF THE PRIOR ART

The use of various cultivator tools is known generally in the art. These tools are used to cultivate the soil between rows of growing crops. This cultivation controls weed growth and softens the soil surface to improve water and fertilizer distribution to the roots of the plants. In many of the cultivators currently in use, a plurality of cultivating tools such as plow blades are rigidly attached to a tool bar that is pulled behind a vehicle, typically a tractor. The support of these tool blades or plow blades in this manner have several drawbacks and disadvantages. A common way of attachment of the plow blades to the tool bar is through the use of U-bolts. This type of attachment is less than satisfactory for several reasons. The plow blades can be forced upwardly out of position and do not exert any downward force. The U-bolts are also apt to stretch or deform during usage so that again the positioning of the plow blades will vary.

It is often necessary to vary the spacing width of the cultivator tools such as the cultivator plow blades to accomodate variations in spacing between rows of crops in different fields. If the crop row width decreases, the plow blades must be moved closer together to prevent the blades from possibly damaging the stalks or roots of the crops by cultivating too close to the crops. Alternatively, if the crop row spacing increases from one field to the next, the plow blades or other cultivating tools will not cultivate closely enough to the base of the crops to properly accomplish adequate cultivation of the crops unless the tool spacing in properly adjusted.

Cultivator plow blades and other similar tools wear in patterns which are frequently uneven. Although an attempt is made to attach the tools to the tool bar in an evenly spaced manner and to have uniform ground penetration and drag, this is not usually obtainable. Thus, frequently one side or portion of a cultivator plow blade or other similar tool will wear faster than the other side. This uneven wear may result in the discarding of tools such as plow blades that have only one side or portion which has been worn out.

The direct connection of a plow blade or similar cultivator tool to a tool bar is often not a particularly strong connection, resulting in bent blades. These bent blades not only do an inadequate job of cultivation, they also disrupt the smooth running of the cultivator tool and cause it to drift and bounce.

SUMMARY OF THE INVENTION

It is an object of the present invention to provide a cultivator tool holder.

Another object of the present invention is to provide an adjustable cultivator tool holder.

A further object of the present invention is to provide an adjustable cultivator tool holder for use with a tool bar.

Still another object of the present invention is to provide an adjustable cultivator tool holder adaptable for use with various cultivator tools.

Yet another object of the present invention is to provide an adjustable cultivator tool holder which is rugged and durable.

As will be set forth in detail in the description of the preferred embodiment, the adjustable cultivator tool holder in accordance with the present invention is comprised of a frame assembly which can be secured to a generally conventional tow bar that is in turn attached to a vehicle such as a tractor. The frame assembly includes plural frame arms, each of which carries a slidable collar or sleeve. This collar or sleeve is formed with a flange to which the cultivator plow blade or other similar tool is connected. These sleeves can be positioned along the lengths of the frame arms, as dictated by crop row spacing so that the areas between the rows will be adequately cultivated. Any variations in crop row spacing from field to field can be readily compensated for by correcting the spacing between adjacent plow blades.

The plow blade carrying collars or sleeves are secured to the frame arms by quick change pins instead of by the use of nuts and bolts as is commonly the case. This facilitates the rapid repositioning of the cultivator tools when such becomes necessary. Since the sleeves are sized to be slidable on, but to still fit snugly about the frame arms, the quick change pins are not relied upon to support the cultivator tools as was the case with the previously used U-bolt assemblies. Thus the tool holders in accordance with the subject invention provide a ready means for changing the spacing of the cultivator tools while at the same time securely positioning the cultivator tools.

Each cultivator tool such as a plow is secured to its own tool holding sleeve that is slidably carried on one of the frame arms of the frames assembly. These cultivator tools can be quickly relocated to a different section of the cultivator by moving the entire sleeve from one frame arm to another much in the same manner in which automobile tires are rotated. This repositioning of the various tools facilitates the even wearing of all of the plow blades or other cultivator tools. Such uniform wearing of all surfaces of each plow blade or the like can be readily seen as means for increasing tool life and reducing tool replacement costs.

The adjustable cultivator tool holder assembly in accordance with the present invention provides a strong connection for the cultivating tools. This is accomplished due to the use of the slidable collars or sleeves that carry the tools and that closely engage the frame arms. Since the tools are rigidly secured, all of the plow blades remain rigid and uniformly parallel to the ground. This insures that the cultivator runs smoothly and does not bounce or drift.

BRIEF DESCRIPTION OF THE DRAWINGS

While the novel features of the adjustable cultivator blade holder in accordance with the present invention are set forth with particularity in the appended claims, a full and complete understanding of the subject invention may be had by referring to the detailed description of the preferred embodiment as set forth hereinafter and as may be seen in the accompanying drawings in which:

DESCRIPTION OF THE PREFERRED EMBODIMENT

Figure 1:
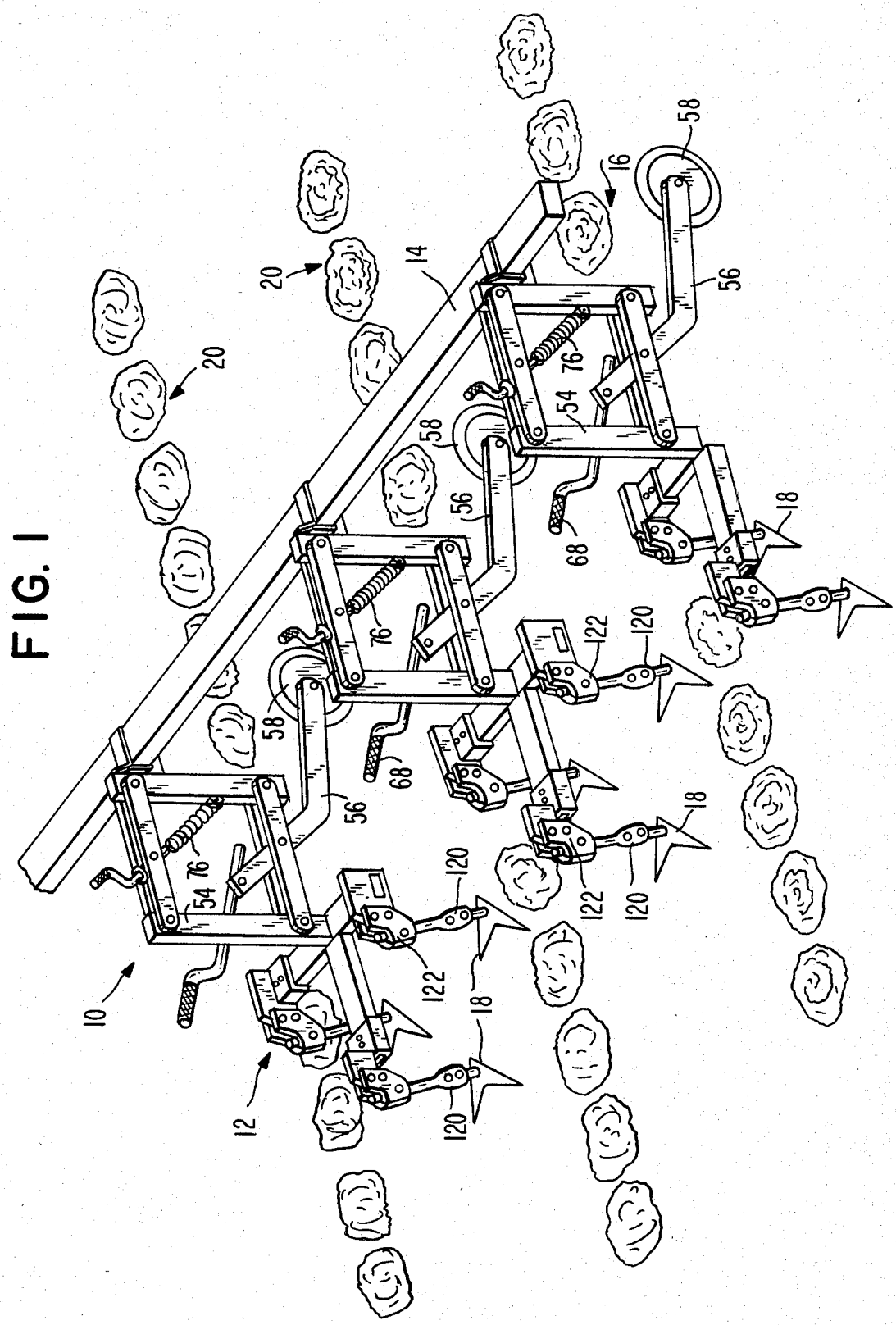
FIG. 1 is a schematic perspective view of a portion of a cultivator assembly utilizing the adjustable cultivator tool holder in accordance with the present invention.

Referring initially to FIG. 1 of the drawings, there may be seen generally at 10 a multi-row cultivator assembly with which the adjustable cultivator tool holder, indicated generally at 12, in accordance with the present invention is used. Cultivator assembly 10 is comprised of an elongated tool bar 14 which is provided with suitable means generally at its midpoint (not shown) to facilitate the attachment of tool bar 14 to the drawbar of a vehicle, typically a farm tractor. Since such attachment means are generally well known in the art, no further discussion thereof is believed necessary.

Tool bar 14 is provided at spaced points along its length with tool attaching and support means 16. One of these tool attaching means 16 is shown in greater detail in FIG. 2 and will be discussed shortly. The purpose of these tool attaching and support means 16 is to provide spaced mounting points for the attachment of various cultivating tools such as plow blades of the type shown at 18 in FIG. 1 or various other earth working tools such as shovels, scooters, sweeps or the like. These various tools are used to cultivate the soil between spaced rows of growing crops such as those indicated generally at 20 in FIG. 1.

Figure 2:
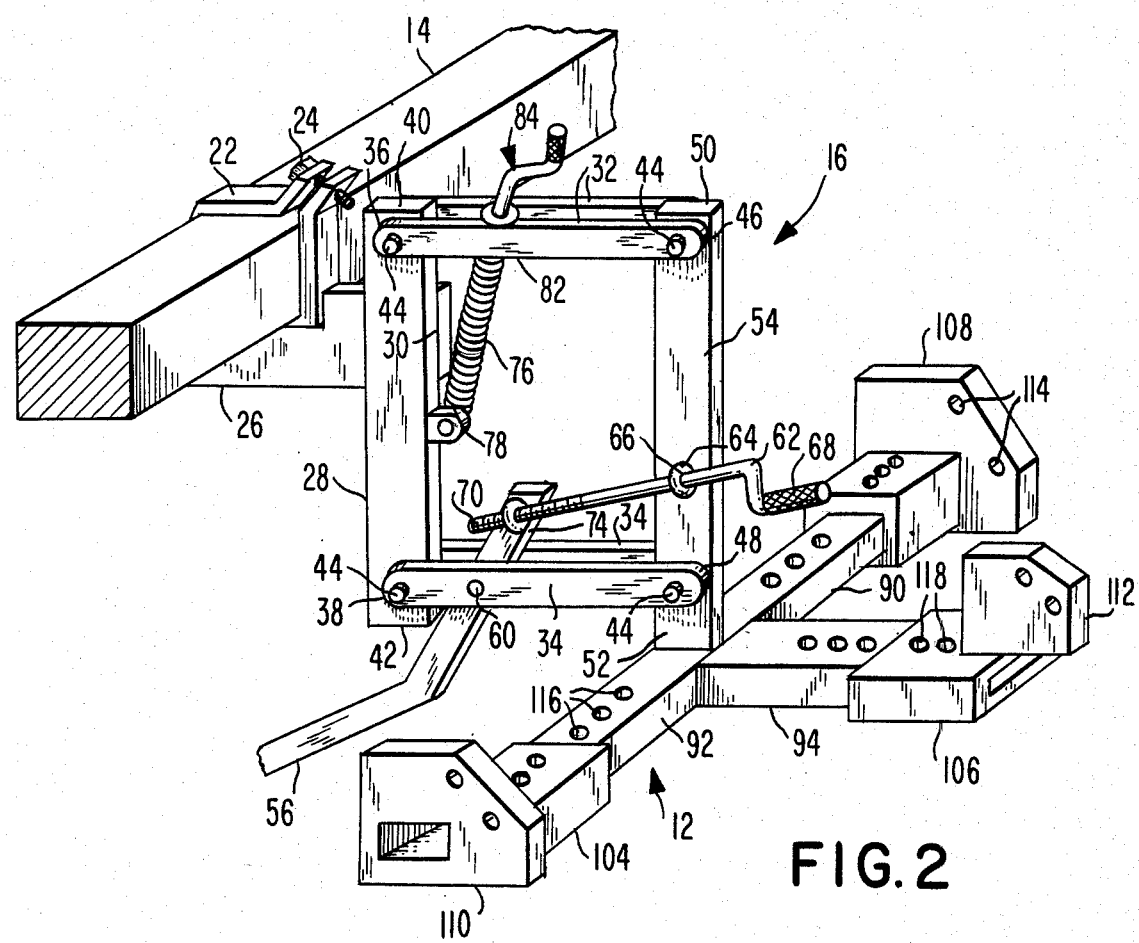
FIG. 2 is a perspective view of a portion of the cultivator shown in FIG. 1 and showing the tool holder mounted to the tool bar.

Turning now to FIG. 2, a section of tool bar 14 and one tool attaching and supporting means 16 to which an adjustable cultivator tool holder 12, in accordance with the present invention, is attached may be seen. A two piece tool bar engaging clamp 22 is secured about tool bar 14 by suitable bolts and nuts 24. The lower portion of tool bar clamp 22 has a rearwardly extending plate 26 secured to it by welding or the like. A generally vertical bar 28 is rigidly affixed to a rearward surface 30 of plate 26. Spaced pairs of upper link arms 32 and lower link arms 34 are pivotably secured at first, forward ends 36 and 38 to upper and lower ends 40 and 42, respectively of vertical bar 28 by suitable pivot pins or bolts, 44. Second, rearward ends 46 and 48 of upper and lower link arms 32 and 34, respectively are pivotably secured to upper and lower portions 50 and 52 of a generally vertical mounting bar 54 which is a portion of the adjustable cultivator tool holder 12. This securement is afforded by suitable pivot pins or bolts 44.

Vertical bar 28, upper link arms 32, lower link arms 34 and vertical mounting bar 54 form a generally rectangular or parallelogram support assembly which is quite rugged and durable. As may be seen in both FIGS. 1 and 2, a support leg 56 for a gauge wheel 58 (shown only in FIG. 1) is carried intermediate its ends between lower link arms 34 by a suitable pivot shaft 60. A wheel height adjusting crank 62 is retained in, and passes through a journal 64 carried in a journal mounting hole 66 positioned generally midway along the length of vertical mounting bar 54. A first end 68 of crank 62 is offset and serves as a handle. A second end 70 of crank 62 is threaded and is received in an adjusting nut 72 pivotably attached to an upper portion 74 of support leg 56. Rotation of crank 62 causes the upper end 74 of support leg 56 to move toward or away from mounting bar 54 thereby raising or lowering the adjustable cultivator tool holder 12 with respect to the tool bar 14. The position of the adjustable cultivator tool holder 12 will be maintained in a selected position due to the influence of a coil spring 76 which is secured at first end 78 to an ear 80 on fixed vertical bar 28 and at a second end 82 to a threaded crank assembly 84 carried by upper link arms 32. A nut (not seen) is afixed to the upper end of spring 76 and receives the threaded lower end of crank assembly 84. The spring force exerted on the upper link arms 32 by spring 76 can be adjusted by actuation of crank assembly 84.

Figure 3:
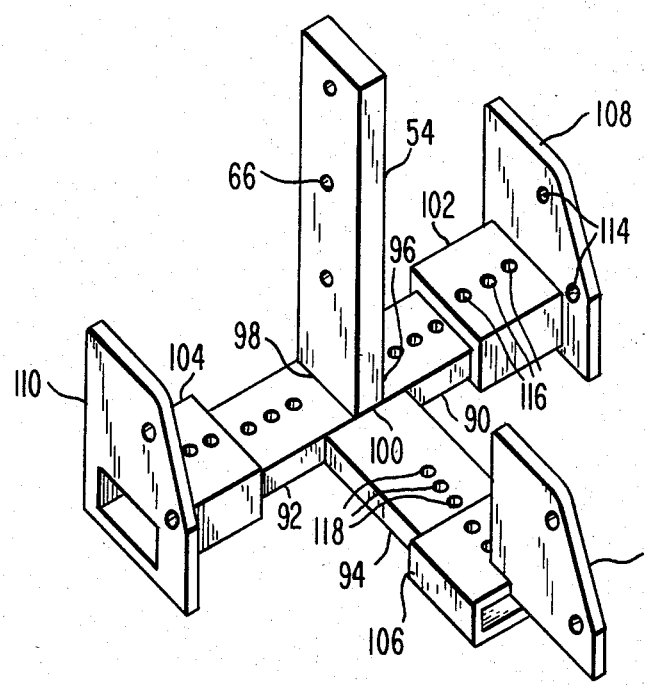
FIG. 3 is a perspective view of a center section tool holder in accordance with the present invention.
Figure 4:
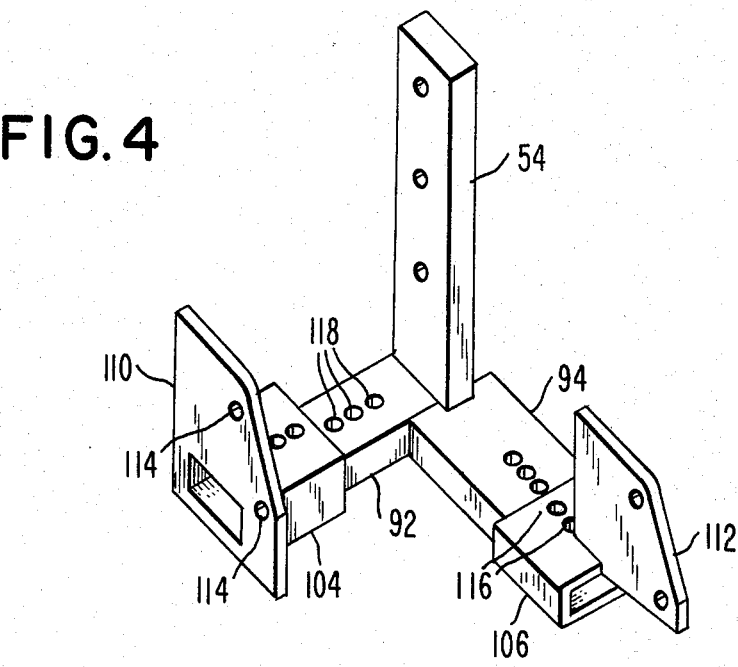
FIG. 4 is a perspective view of a left section tool holder.
Figure 5:
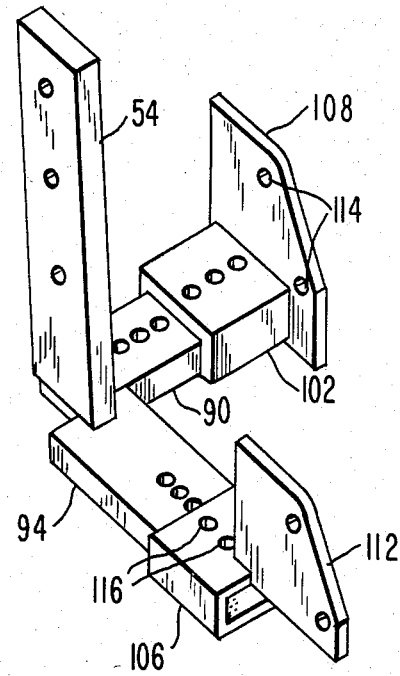
FIG. 5 is a perspective view of a right section tool holder in accordance with the present invention.

Turning now to FIGS. 2 and 3, the adjustable cultivator tool holder 12 will be described in detail. Holder 12 is comprised of the generally vertical mounting bar 54, discussed previously, a right frame arm 90, a left frame arm 92, and a rear frame arm 94. The center section tool holder shown in FIGS. 2 and 3 includes both right and left frame arms 90 and 92. The left section tool holder shown in FIG. 4 does not have the right frame arm 90 and the right section tool holder shown in FIG. 5 does not have the left frame arm 92. The terms left and right section units do not necessarily refer to the side of the tool bar to which the section is attached but rather to the direction in which the frame arm extends. It will be understood that these left and right sections can be secured to the tool bar in any desired location dependant upon the configuration of the area to be cultivated.

Each frame arm is generally rectangular and all three of the arms are in the same plane which is generally perpendicular to the plane of mounting bar 54. The frame arms 90, 92, and 94 are rigidly secured to each other and to mounting bar 54 by any suitable means such as welding, at their inner ends 96, 98, 100. Each arm 90, 92, and 94 carries a tool mounting collar or sleeve 102, 104, and 106. Each such collar or sleeve 102, 104, and 106 is generally box shaped and slides along its cooperating frame arm. It will be understood that the collars or sleeves are so sized that they are slidable along the frame arms but closely overlie the arms to form a snug fit with the frame arms. Each collar or sleeve 102, 104 or 106 carries a tool supporting flange 108, 110 or 112. Flanges 108 and 110 on right and left collars or sleeves 102 and 104, respectively are secured to the outboard ends thereof while flange 112 is secured to the upper surface of collar 106 generally at the midline of this collar. Each of the tool supporting flanges 108, 100 and 112 is generally vertical and carries spaced tool mounting apertures 114.

Each of the collars or sleeves 102, 104, and 106 is selectively positionable along the length of its corresponding frame arm and is held in a selected position through the cooperation of corresponding apertures 116 on the sleeves and holes 118 in the frame arms. Suitable quick release pins can be passed through the apertures 116 in the collars and the holes 118 in the frame arms to hold the sleeves in desired locations. It should be noted that the flanges 108, 110 and 112 are suitably structured so as not to obstruct the passage of the outer ends of the frame arms through the collars or sleeves when the sleeves be moved to inboard positions.

Returning to FIG. 1 it may be seen that a plurality of suitable cultivating tools such as generally V-shaped plows 18 are secured to the flanges 108, 110, and 112. This is accomplished by securing the plows 18 in plow holders 120 that are, in turn bolted to transition pieces 122 which are bolted to the tool mounting holes 114 provided on the trailing edges of the tool supporting flanges. It will be understood that plows 18 are representative of a number of cultivating tools which could be used to cultivate the soil. It should be further understood that plow holders 120 and transition pieces 122 will also vary depending on the type of cultivating tool being used. Any holders and transition pieces which will accomplish the task of securing the cultivating tool to the flange portions of the adjustable cultivator tool holder could be used.

In use, tool bar 14 is attached to a suitable tow vehicle such as a farm tractor and the tool bar and its attached tools are moved to a field to be cultivated. The spacing of the rows of crops is apt to differ from field to field and adjustment of the position of the cultivator tools is required. This is readily accomplished by removing the quick change or quick release pins that pass through the apertures 116 in the collars or sleeves 102, 104, and 106 and through the cooperating holes 118 in the several frame arms. The right and/or left collars or sleeves 102 and/or 104 can then be moved either inwardly or outwardly along right and/or left frame arms 90 and 92 until the cultivating tools, such as plows 18, are laterally spaced at a proper distance with respect to the spacing of the rows of crops. The rear tool mounting collar 106 can be similarly moved along rear frame arm 94 either forwardly or rearwardly. Once all of the collars have been properly located on their frame arms, the quick change pins can be reinserted to secure the sleeves or collars in place. The gauge wheels 58 can be adjusted by means of the wheel height adjusting crank 62 to set the position of the cultivator tools. Once these tools are all properly set, the field can be cultivated. The cultivation of another field with differing row spacing or plant sizes can be subsequently accomplished by quickly adjusting the spacing of the cultivating tools. If uneven wear is noted on one of the tools, the entire tool, its support and transition means, and supporting collar or sleeve, can be removed from a frame arm as a unit and can be switched with a corresponding unit on another frame arm. This ease of rotation of tools prolongs tool life by equalizing tool wear on all of the various tools spaced along the tool bar. The rigid support for the various cultivator tools provided by the cooperating collars or sleeves and frame arms also insures that all of the cultivating tools will be rigidly and uniformly supported. This lets the cultivator run smoothly with less drifting or bouncing than has been previously possible. Such smooth running results in far fewer bent tools and more effective cultivation.

While a preferred embodiment of an adjustable cultivating tool holder in accordance with the present invention has been fully and completely described hereinabove, it will be obvious to one of skill in the art that a number of changes in, for example, the number of tool holders carried by the tool bar, the type of cultivating tool, the specific type of quick change pin and the like could be made without departing from the true spirit and scope of the subject invention which is accordingly to be limited only by the appended claims.

I claim:

1. An adjustable cultivator tool holder for use with a tool bar adapted to be secured to a vehicle for effecting movement of such tool bar and said adjustable tool holder to cultivate soil between spaced rows of crops, said adjustable cultivator tool holder comprising:

a cultivator tool support means including a vertical bar, means for attachment of said vertical bar to a tool bar, a vertical mounting bar positioned rearwardly of said vertical bar and generally parallel thereto, and spaced upper and lower link arms pivotably attached at forward ends to upper and lower portions respectively of said vertical bar and pivotably attached at rearward ends to upper and lower portions respectively of said vertical mounting bar, said vertical bar, upper and lower link arms, and vertical mounting bar defining a generally rectangular vertical plane;

a gauge wheel secured to a lower end of a support leg, said support leg being pivotably secured at a point intermediate its ends to said lower link arms and being adjustably positioned by a gauge wheel height adjusting crank assembly;

at least first and second cultivator tool holder frame arms fixedly secured at first ends to each other and to said vertical mounting bar, each of said tool holder frame arms extending outwardly from said vertical mounting bar in a generally horizontal plane which is generally perpendicular to said vertical mounting bar, each of said tool holder frame arms being generally rectangular in cross-section and having plural spaced holes;

a tool mounting sleeve slideably carried on each of said frame arms, each of said sleeves being generally rectangular in cross-section and having spaced holes, said holes in said sleeve and in said cooperating frame arm along which each of said sleeves is slideable being alignable and adapted to receive quick release pins to secure said sleeve in a selected position on said frame arm;

a tool supporting flange secured to each of said tool mounting sleeves, each of said tool supporting flanges being generally perpendicular to said horizontal plane defined by said cultivator tool holder frame arms and generally parallel to said vertical plane defined by said cultivator tool support means; and means for attaching a cultivator tool to each of said tool supporting flanges.

2. The adjustable cultivator tool holder in accordance with claim 1 wherein said first and second tool holder frame arms extend outwardly from said vertical mounting bar in said generally horizontal plane and are generally perpendicular to each other with one of said frame arms also being generally perpendicular to said vertical plane.

3. The adjustable cultivator tool holder in accordance with claim 2 further wherein a third tool holder frame arm extends outwardly from said vertical mounting bar generally in said horizontal plane and generally perpendicular to one of said first and second tool holder frame arms.

* * * * *